United States Patent [19]

Araki et al.

[11] Patent Number: 4,727,529
[45] Date of Patent: Feb. 23, 1988

[54] PICKUP UNIT FOR USE IN AN OPTICAL INFORMATION RECORD/REPRODUCE SYSTEM

[75] Inventors: Yoshitsugu Araki; Yoshihisa Ito; Masaru Ishikawa; Hideyuki Takeuchi, all of Saitama, Japan

[73] Assignee: Pioneer Electronic Corporation, Tokyo, Japan

[21] Appl. No.: 840,824

[22] Filed: Mar. 18, 1986

[30] Foreign Application Priority Data

Mar. 18, 1985 [JP] Japan ..................... 60-54027

[51] Int. Cl.⁴ .............................................. G11B 7/00
[52] U.S. Cl. ........................................ 369/44; 369/46
[58] Field of Search ............. 250/201 DF; 369/44–46, 369/111

[56] References Cited

U.S. PATENT DOCUMENTS

| 4,607,357 | 8/1986 | Okano | 369/44 |
| 4,634,853 | 1/1987 | Kanamaru | 369/44 |

Primary Examiner—Donald McElheny, Jr.
Attorney, Agent, or Firm—Sughrue, Mion, Zinn, Macpeak and Seas

[57] ABSTRACT

A pickup unit for use in an optical information record-/reproduce system comprising a plurality of optical elements including a light-emitting device and an objective lens by which the light issuing from the light-emitting device is focused as a beam spot on the recording surface of a recording medium, a retaining mechanism that holds the plurality of optical elements and which is movable in a direction parallel to the recording surface, and a tilt servo mechanism for causing the optical axis of the beam spot to intersect the recording surface at right angles. The tilt servo mechanism includes a sensor for detecting the angle of inclination of the optical axis in relation to the recording surface. The sensor has a sensor stay as an integral part thereof. The sensor stay is provided as an integral part of the retaining mechanism and is movable with respect to the recording surface.

5 Claims, 36 Drawing Figures

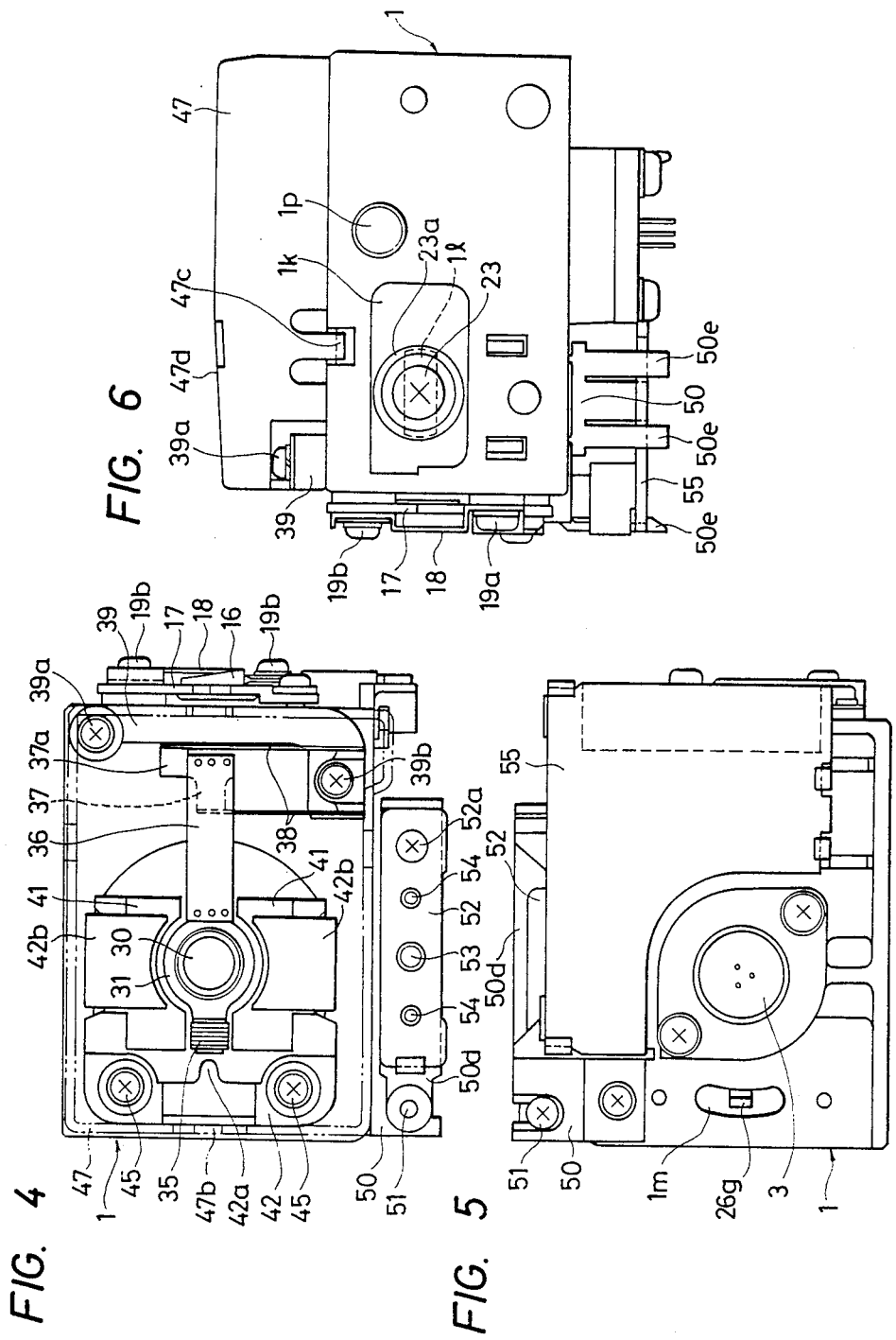

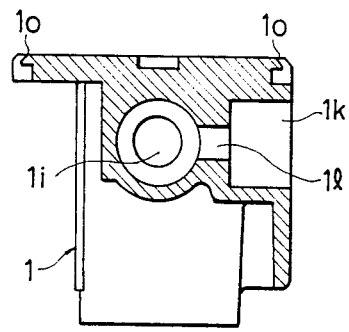
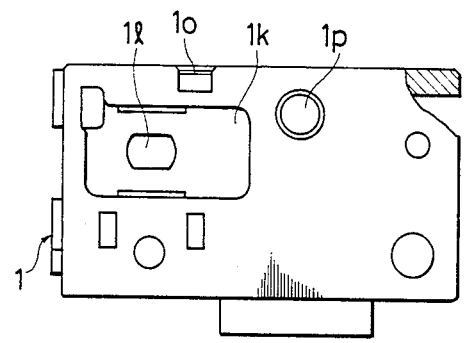
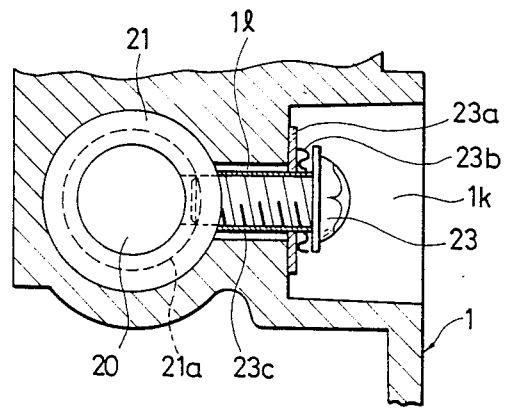

FIG. 14(c)
FIG. 14(e)
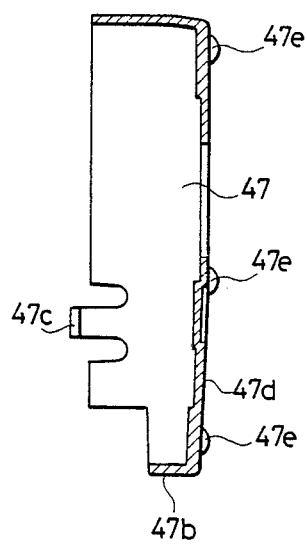
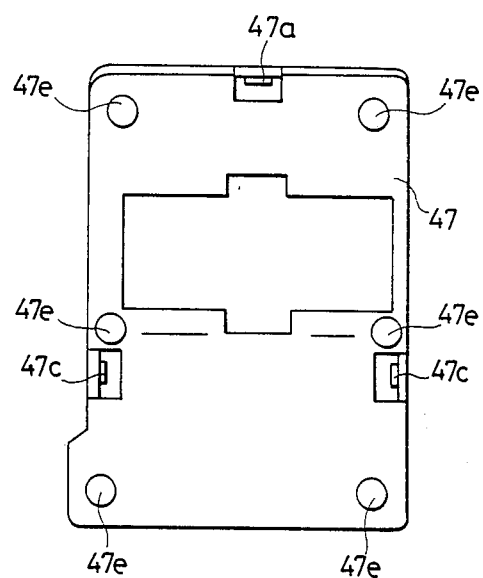

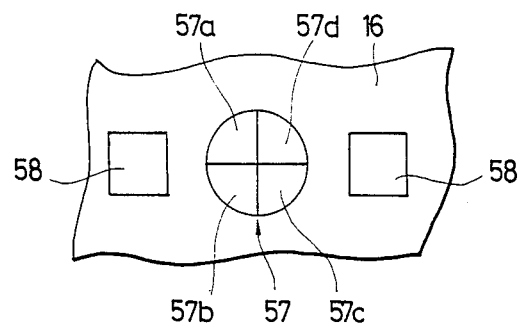
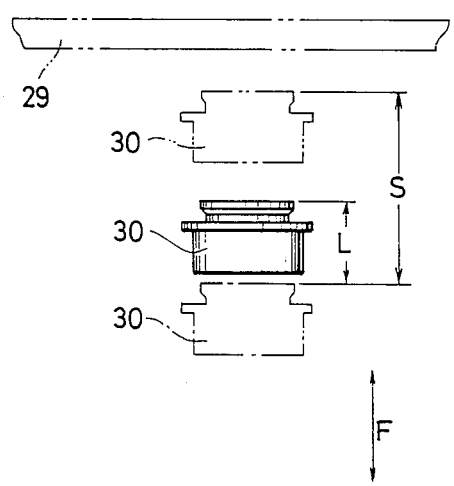

PICKUP UNIT FOR USE IN AN OPTICAL INFORMATION RECORD/REPRODUCE SYSTEM

BACKGROUND OF THE INVENTION

The present invention relates to a pickup unit for use in an optical record/reproduce system.

Video disks, digital audio disks and other information recording mediums in the form of disk store information signals in tiny pits (or dips) that are etched onto the disk surface in the form of a spiral track in correspondence with the information signals to be recorded. In order to read the recorded information signal, a small beam spot is emitted on the surface of the disk and the change in the reflected light which is determined by the presence of or absence of a pit is converted to a corresponding electrical signal for reproduction of the original information signal. Faithful signal reproduction requires the emitted light to be correctly focused on the recording surface of the disk and, to this end, the position of the objective lens for focusing the emitted light on the recording surface must be controlled in the direction of its optical axis (focusing direction) by using a focusing servo drive. In addition to this need for performing focus servo, the emitted light must follow the recording track accurately by virtue of its position being controlled in the tracking direction normal to the optical axial direction. This tracking servo and the focusing servo drive must be supplemented by the "tilt servo" which is necessary to maintain the recording surface of the disk in an orthogonal relationship with the optical axis of the emitted light. If the orthogonal relationship between the recording surface of the disk and the optical axis of the emitted light is not established, the beam spot focused on the recording track being read becomes distorted and crosstalk (i.e., interference from information recorded on an adjacent recording track can cover). The tilt servo is necessary in order to avoid this problem.

While various mechanisms for performing the tilt servo have so far been developed, they are essentially the same in that they incorporate a sensor for detecting the angle of relative inclination between the recording surface of the disk and the optical axis of the emitted light, with the sensor being in most cases composed of a single light-emitting device and two light-receiving devices. This sensor is attached to a sensor board mounted on a holder mechanism which holds a plurality of optical elements including the objective lens mentioned above and which is movable on the recording surface of the disk.

It is not however necessarily easy to ensure precise detection of the angle of relative inclination between the recording surface of the disk and the optical axis of the emitted light because of such factors as the errors introduced into the radiation mode and the amount of light issued from the light-emitting device, and variations in the output characteristics of the light-receiving device.

The pickup unit is typically equipped with a control circuit board which ensures proper performance of the aforementioned three servo drives, i.e., focus servo, tracking servo and tilt servo. This control circuit board is fixed to the main frame of a retainer mechanism by means of screws, washers and associated devices, with an intervening element such as a positioning member being disposed between the circuit board and main frame. This is also true with the sensor board to which the aforementioned sensor is attached. In other words, the conventional pickup unit includes a sensor board, control circuit board and other individual components which are mounted on their retainer mechanism by means of screws and other appropriate fastening means. Not only does this lead to high manufacturing costs because of the need for using a large number of parts but also the overall size of the pickup unit is increased.

SUMMARY OF THE INVENTION

The present invention has been accomplished in order to solve the aforementioned problems. One of the objects of the present invention is to provide a pickup unit which is capable of absorbing any variations in the sensor characteristics that result from the errors introduced into the radiation mode and the amount of the light issued from the light-emitting device as well as from variations in the output characteristics of the light-receiving device. Another object of the invention is to provide a pickup unit that can be manufactured at a reduced cost and which has a smaller overall size.

According to one embodiment, the pickup unit of the present invention includes a sensor for detecting the angle of relative inclination between the optical axis of a beam spot and the recording surface of a recording medium, said sensor being attached to a sensor stay mounted on a retaining mechanism which holds a plurality of optical elements including an objective lens and which is movable in a direction parallel to said recording surface, said sensor stay being movable with respect to said recording surface.

According to another embodiment of the present invention, the retaining mechanism described above has a retaining member that holds a fixed optical system including a light-emitting device and a movable optical system including an objective lens, and a resin-made support that extends along one lateral side of said retaining member which corresponds to said fixed optical system and which has, as an integral part thereof, said sensor stay at one end of said support in the vicinity of said movable optical system, said support carrying a control circuit board at the other end thereof.

BRIEF DESCRIPTION OF THE DRAWINGS

FIGS. 2 to 5 are views of the pickup unit of FIG. 1 as seen in the directions indicated by lines II—II, III—III, IV—IV and V—V, respectively;

FIG. 6 is a view of the pickup unit of FIG. 3 as seen in the direction indicated by line VI—VI;

FIGS. 8(a) to (f) show the pickup body of the unit of FIG. 1 from various sides, (a) being a front view with one half of the section thereof being taken away, (b) a cross section as seen from the left side, (c) a cross section as seen from the right side, (d) a plan view, (e) a bottom view, and (f) a rear view.

FIG. 9 shows in detail a part of the pickup unit of FIG. 1;

FIGS. 14(a) to (e) show the cover member from various sides, (a) being a plan view, (b) a cross section as seen from the left side, (c) a cross section as seen from the right side, (d) a front view, and (e) a rear view;

FIG. 16 shows details of the light-intercepting surface of the light-receiving device; and FIG. 17 illustrates the relationship between the stroke of the objective lens and various positions at which it is caused to stop.

DETAILED DESCRIPTION OF THE PREFERRED EMBODIMENTS

The pickup unit according to one embodiment of the present invention is hereunder described with reference to the accompanying drawings.

Figure 1:
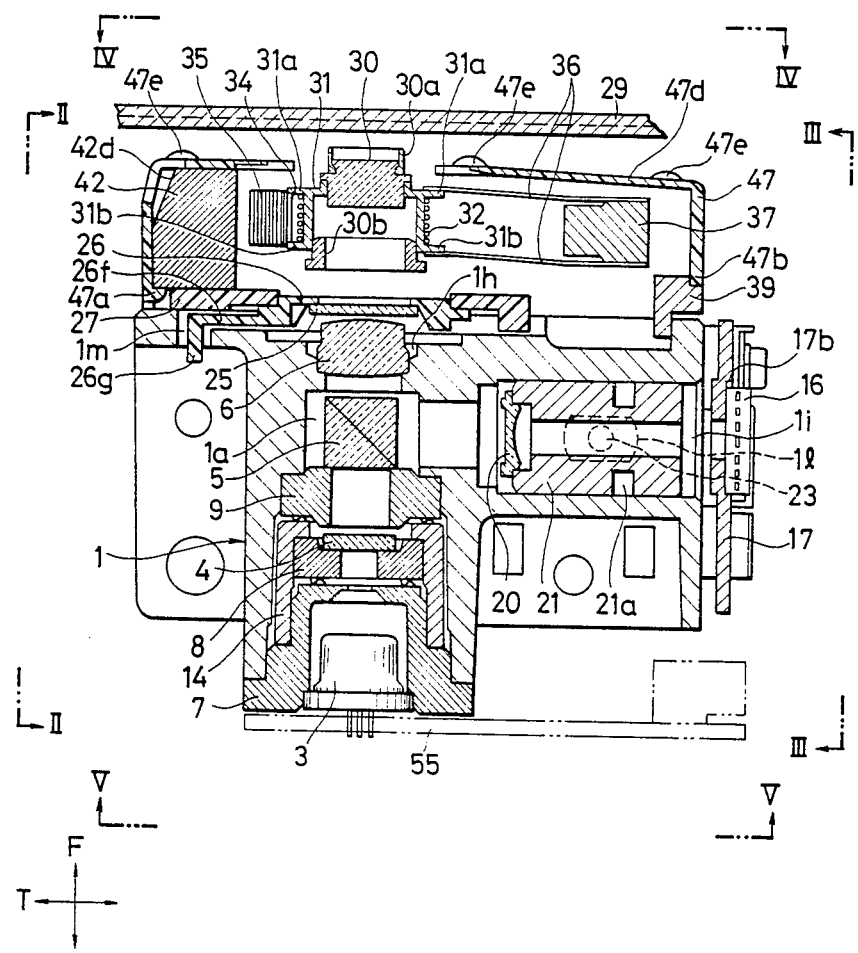
FIG. 1 is a cross section of the pickup unit, as seen from the front, in accordance with one embodiment of the present invention.

As shown in FIGS. 1 to 6, this pickup unit has a pickup body 1 serving as a holding member. The pickup body 1 is made of aluminum or an alloy thereof, or a synthetic resin or any other appropriate material, and has a through-hole 1a as shown in FIG. 1. Within the through-hole 1a, a laser diode 3 serving as a light-emitting device, a grating (diffraction grating) 4, a beam splitter 5 and a collimator lens 6 are disposed coaxially. The light emitted from the laser diode 3 is passed through the grating 4 and divided into two components of light. One for both reproducing an RF signal and carrying out the focus servo, and the other component is provided for performing the tracking servo. The emitted light is also transmitted through the beam splitter 5 which bends the light reflected from the recording surface of the disk (to be described hereinafter) with respect to the emitted light and subsequently directs the bent reflected light into a light-receiving device which is also to be described hereinafter. The collimator lens 6 converts the emitted light into a beam made up of parallel rays of light.

The laser diode 3, the grating 4 and the beam splitter 5 are carried in cylindrical holders 7, 8 and 9, respectively, such that the optical axes of these optical elements are in alignment with the central axes of the respective holders which are stacked within the through-hole 1a. The through-hole 1a is circular in cross section as taken on a line transversal to the central axis of that hole, and therefore, the holders 7, 8 and 9 are movable along their respective central axes and are rotatable about these axes. The holder 7 is fixed to the pickup body 1 by screws. As is evident especially from FIG. 7, a wave washer or coil spring 11 serving as a resilient member is disposed between the holders 7 and 8, and a similar wave washer or coil spring 12 is interposed between the holders 8 and 9.

The holders 7 and 9 are properly positioned in the direction in which they are inserted into the through-hole 1a by virtue of an arrangement wherein their peripheries respectively engage with the receiving faces 1b and 1c formed on the pickup body 1. A cylindrical sleeve 14 is tightly fitted over the holder 8 which is sandwiched between the holders 7 and 9. One axial end of the sleeve 14 engages with the receiving face 7a formed on the holder 7, and this engagement restricts the movement of the sleeve 14 toward the holder 7. At the other end of the sleeve 14 in its axial direction is provided a wall portion 14b having a light transmitting aperture 14a, and this wall portion 14b, making contact with one axial end of the holder 8, properly positions the holder in the direction in which it is inserted into the through-hole 1a. In other words, the sleeve 14 serves as a member for positioning the holder 8 properly between the holders 7 and 9.

The features of the holders 7 to 9 and the sleeve 14 are hereunder described more specifically.

The holder 7 carries the laser diode 3 working as a light-emitting device. The laser diode 3 is supported in the holder 7 by virtue of an arrangement wherein it is pressed against the inner surface 7b thereof at one end in its axial direction. The other end of the holder 7 in its axial direction has a wall portion 7d as an integral part thereof and a pupil 7c is formed in this wall portion. Since the pupil 7c is formed as an integral part of the holder 7, the laser diode 3 can be fixed in the holder 7 with high precision by means of press-fitting, the pupil 7c being positioned with great precision in relation to the laser diode 3, particularly within a plane normal to the axis of the emitted light, thereby enabling the light issuing from the laser diode 3 to be cut into a beam spot that approximates very closely to the true circle having its center at the optical axis of that light.

In the next place, we describe the holder 8 for carrying the grating 4 and the sleeve 14 which is fitted over this holder. The grating 4 is bonded to one end of the holder 8 in its axial direction. The light transmitting aperture 14a formed in the sleeve 14 has an inside diameter larger than the outside diameter of the grating 14 so as to enable the bonding of the grating 4 after a subassembly consisting of the laser diode 3, holder 7, holder 8, wave washer 11 and the sleeve 14 is made. In addition, the grating 4 bonded to the sleeve 14 will exhibit high adhesive strength. The grating 4 is carried on the holder 8 in such a manner that the outer surface 4a of the grating 4 is positioned inward from the outer surface 14c of the wall portion 14b of the sleeve 14. This prevents any external object from contacting the grating 4 that has been adhesively fixed to the sub-assembly of the laser diode 3, the holders 7 and 8, the wave washer 11 and the sleeve 14; as a result, the bonded grating 4 is protected against external damage, ensuring stabler and more precise bonding to the sleeve 14.

The holder 9 which combines with the holder 7 to sandwich the holder 8 is provided with a center ring guide 9a which engages with the center hole in the corrugated washer 12. This center ring guide 9a permits the wave washer 12 to be accurately positioned with respect to the center axes of the holder 9 and the sleeve 14, and the drag that is caused against the rotation of the holder 9 by the compressive force of the wave washer 12 is distributed uniformly around the central axis of the holder 9, thereby ensuring smooth rotation of the holder. Like the holder 9, the holder 8 carrying the grating 4 will revolve upon application of a rotational force which is greater than the drag resulting from the compressive force of the wave washer 11. The holder 8 is separated from the holder 9 by the sleeve 14 which is fixed to the pickup body 1 with the intervening holder 7 present therebetween, so either one of the holders 8 and 9 can be rotated without causing the other to revolve.

Figure 7:
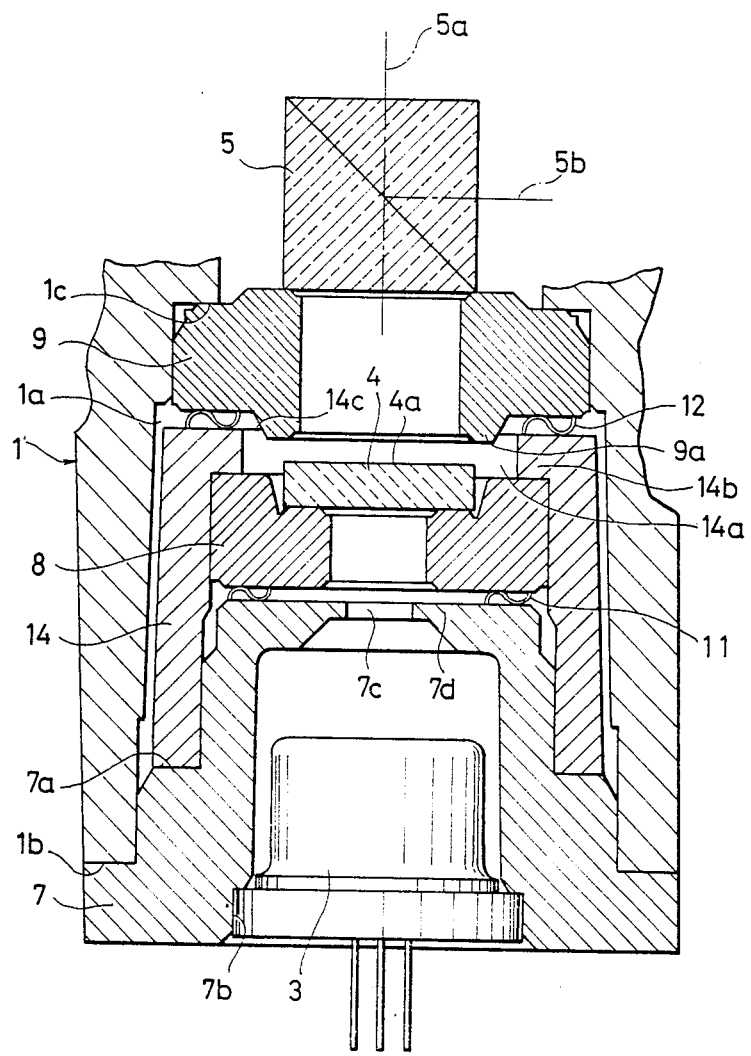
FIG. 7 shows in detail a part of the pickup unit of FIG. 1.
Figure 8D:
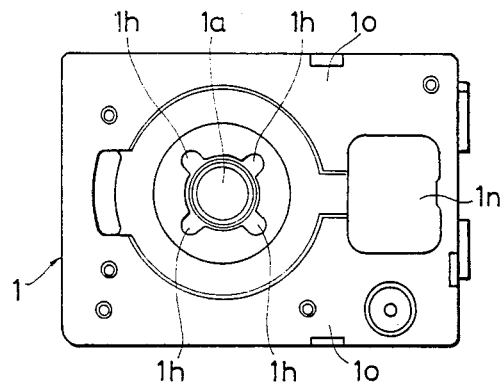
Figure 8B:
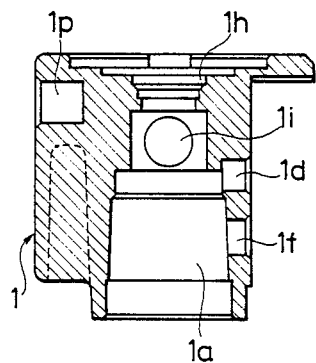
Figure 8A:
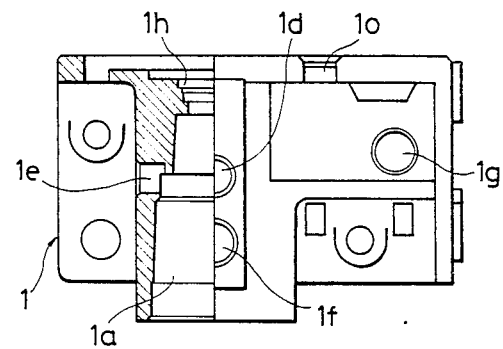
Figure 8E:
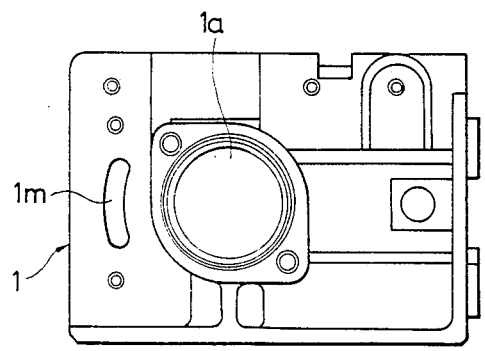

The overall configuration of the pickup body 1 may be clear from FIG. 8(a) to (f). As shown in FIG. 8(a) and (b), the pickup body 1 may be provided with four holes 1d, 1e, 1f and 1g through which jigs are to be inserted for the purpose of adjusting the positions of the optical elements. The holes 1d and 1e are provided in correspondence with the holder 9 carrying the beam splitter 5. As shown in FIG. 7, the beam splitter 5 has two optical axes 5a and 5b. The hole 1d is formed such that its central axis is perpendicular to the plane including these two optical axes which the hole 1e is formed such that its central axis is parallel to that plane. The holes 1f and 1g are formed parallel to the hole 1d, with the hole 1f corresponding to the holder 8 carrying the grating 4. The hole 1g provided in the vicinity of the end of the pickup body 1 is positioned such that it corresponds to a cylindrical holder carrying a multiplex lens 20 which is to be described hereinafter.

Appropriate jigs (not shown) are inserted into the respective holes 1d to 1g until the tip of each jig comes into proper engagement with the holder 8 or 9 which enables the revolution and positional adjustment of each holder, and hence, the optical element carried on each holder. It is to be noted here that the holes 1d to 1g are designed to have different inside diameters.

As is clear from FIG. 1, the collimator lens 6 disposed above the beam splitter 5 is attached directly onto the pickup body 1 and is positioned such that the outer refractive surface of the collimator lens will lie inward from the surface of the pickup body 1. The collimator lens 6 is bonded adhesively to the pickup body 1. As is also shown in FIG. 8(a), (b) and (d), adhesive reservoirs 1h are provided around the bonded surface of the collimator lens. These adhesive reservoirs 1h combined with the capillary action of the interface between the pickup body 1 and collimator lens 6 will ensure strong adhesion between the two members by supplying a consistent and exact amount of the adhesive to the mating surfaces.

As shown in FIGS. 1 and 8(b), the pickup body 1 is provided with a guide hole 1i that extends at a right angle with respect to the through-hole 1a and which communicates with the hole and the guide hole 1i is positioned laterally in relation to of the beam splitter 5. The open end of the guide hole 1i is fitted with a tabular light-receiving device 16. As is particularly clear from FIG. 3, the light-receiving device 16 is carried on a tabular base member 17 which is attached to the pickup body 1 by means of L-shaped compressive springs 18 and by screws 19a and 19b threaded into the pickup body 1. The screws 19b positioned on the springs 18 are loosely fitted into rectangular openings 17a formed in the base member 17, and by loosening these screws 19b, the position of the base member 17, and hence, the light-receiving device 16 can be adjusted within a plane perpendicular to the optical axis of the device 16. As is also shown in FIG. 1, the major surface of the tabular base member 17 is provided with a recess 17b onto which the light-receiving device 16 is bonded. In the embodiment shown, the recess 17b has a rectangular shape that permits the light-receiving device 16 to be properly positioned within a plane perpendicular to the optical axis of the device 16, thereby ensuring very accurate positioning of the device 16. The recess 17b has a larger area than that of the major surface of the light-receiving device 16 and the excess area of the recess 17b also serves as an adhesive reservoir. This arrangement will ensure strong adhesion between the light-receiving device 16 and the recess 17b by supplying a consistent and exact amount of the adhesive to the mating surface.

A cylindrical holder 21 carrying a multiplex lens 20 in such a manner that its optical axis is in alignment with the central axis of the holder 21 is inserted into the guide hole 1i made in the pickup body 1. The diameter of the holder 21 is made slightly smaller than the inside diameter of the guide hole 1i so that the holder 21 is slidable along its central axis, or the optical axis of the multiplex lens 20, and is rotatable about the optical axis. The multiplex lens 20 will perform the function of the combination of a "cylindrical" lens and a conventional convex lens.

As shown in FIGS. 6 and 8(c) and (f), the pickup body 1 is provided with a spot facing 1k that extends in a direction transverse to the guide hole 1i, and the bottom of this spot facing is provided with a slot 1 communicating with the guide hole 1i. The slot 1l is formed such that its major axis is parallel to the guide hole 1i. As is particularly clear from FIG. 9, a screw 23 is inserted into the spot facing 1k together with a washer 23a and a wave washer 23b serving as a resilient member. The threaded portion of the screw 23 is inserted into a neck sleeve 23c and is threaded into the holder 21 through the slot 1l. The head of the screw 23 makes contact with the peripheral edge of the slot 1l with the washer 23a and the wave washer 23b being interposed between the two members. Because of this arrangement, the holder 21 is movable in relation to the pickup body with the limits of the distance over which the neck sleeve 23c in outward contact with the screw 23 is capable of moving through the slot 1l. It should be mentioned that the slot 1 as combined with the screw 23, the wave washer 23b, neck sleeve 23c and other associated components makes up a fixing mechanism by which the holder 21 is fixed in relation to the pickup body 1.

An annular groove 21a is formed around the holder 21, and the hole 1g formed in the vicinity of the end of the pickup body 1 corresponds to this annular groove 21a. The hole 1g and the slot 1l are formed such that they maintain a predetermined angle, which is about 180' in the embodiment shown, with respect to the central axis of the holder 21. If the hole 1g and the slot 1l are spaced from each other at an angle of substantially zero with respect to the central axis of the holder 21, the two members must be offset from each other along the central axis of that holder, and given the layout described hereinbefore, the size of the holder 21 is increased, leading to an increase in the overall size and the cost of the pickup unit. These problems are avoided by establishing a certain angular relationship (e.g. 180°) between the hole 1g and the slot 1l with respect to the central axis of the holder 21.

As shown in FIG. 1, a wavelength plate 25 having a rectangular tabular form is disposed above the collimator lens 6 and is carried on a tabular base member body 27 via a holder 26. The holder 26 and the base member body 27 are combined together to make up a base member. The base member body 27 is retained by the pickup body 1. The wavelength plate 25 has the function of changing the direction of light deflection in order to allow the beam splitter 5 to effect separation between the light emitted from the laser diode 3 and the light reflected from the recording surface of the disk.

The holder 26 and the base member body 27 are hereunder described in more detail with reference to FIGS. 10 and 11.

Figure 10A:
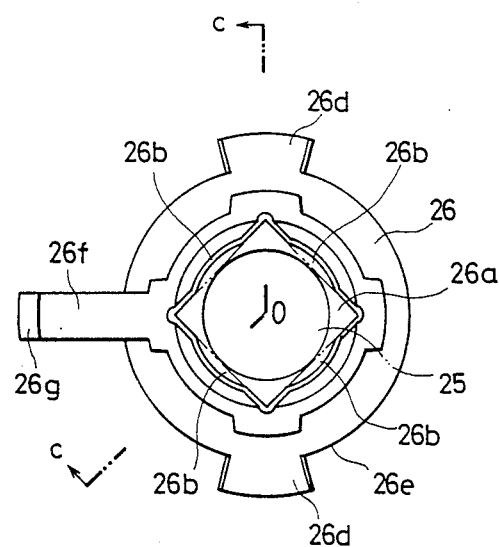
FIGS. 10(a) and (b) are plan and front views, respectively, of the holder carrying a wavelength plate.
Figure 10C:
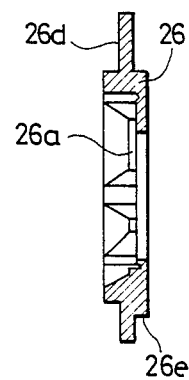
FIG. 10(c) is a cross section of FIG. 10(a) as taken on line c-o-c.
Figure 10B:
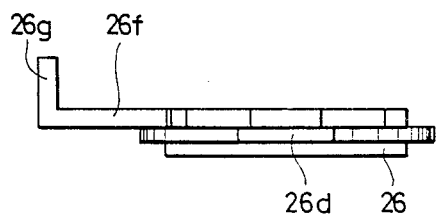
Figure 11C:
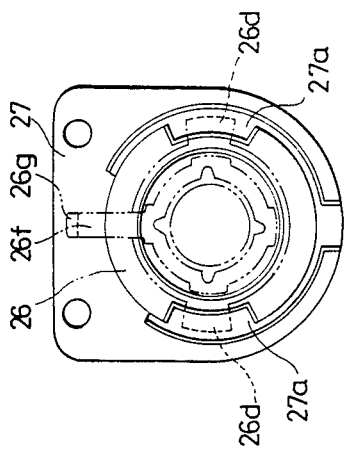
FIGS. 11(a), (b) and (c) show the base member body carrying the holder, (a) being a plan view, (b) a right side view, and (c) a rear view.
FIG. 11(d) is a cross section of FIG. 11(a) as taken on line d—d.
Figure 11B:
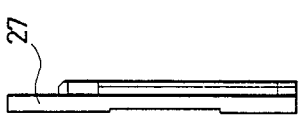
Figure 11A:
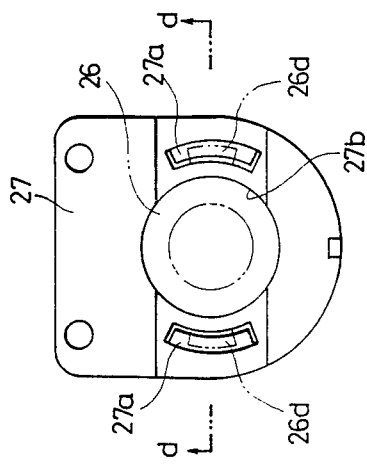
Figure 11D:
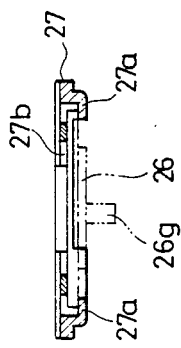

First of all, the holder 26 is generally in the form of a disk as shown in FIG. 10(a) to (c). The major surface of the holder 26 is provided with a spot facing 26a into which the wavelength plate 25 is inserted, and the wavelength plate 25 is bonded adhesively to the bottom of this spot facing. The spot facing 26a is partly provided with four arched areas 26b so that not only the rectangular wavelength plate 25 but also one having a circular shape can be inserted into the spot facing. In the case of the rectangular wavelength plate 25, the arched portions 26b will serve as adhesive reservoirs while the four corners of the spot facing 26a will provide adhesive reservoirs in the case of a circular wavelength plate.

As shown in FIG. 11(a) to (d), the base member body 27 is provided with two support projections 27a that will support the holder 26 by engaging with two corresponding projections 26d extending from the periphery of the holder 26 in two opposite directions. The holder 26 is rotatable in a sliding fashion with respect to the base member body 27 and within a plane perpendicular to the optical axis of the wavelength plate 25. As is clear from FIG. 11(a) and (c), the central hole 27b in the base member body 27 makes slidable contact with the periphery 26e of the holder 27 so as to prevent the holder from slipping in the radial direction during its rotation in a sliding fashion.

The periphery of the holder 26 is provided with an arm 26f that projects in the radial direction of that holder, and the foremost end of the arm 26f is bent at a right angle. As shown in FIG. 1, the bent end 26g of the arm is exposed to the outside of the pickup body through an opening 1m formed therein. By manipulating this bent end 26g with a finger, the user is capable of adjusting the angular position of the holder 26, and hence, the wavelength plate 25.

The above-described pickup body 1 as combined with the laser diode 3, grating 4, beam splitter 5, collimator lens 6, cylindrical holders 7, 8 and 9, wave washers 11 and 12, cylindrical sleeve 14, light-receiving device 16, tabular base member 17, multiplex lens 20, cylindrical holder 21, the fixing mechanism already described which includes the wave washer 23b and screw 23, the wavelength plate 25, holder 26, tabular base member body 27 and associated peripheral minor components make up a fixed optical system.

Figure 12:
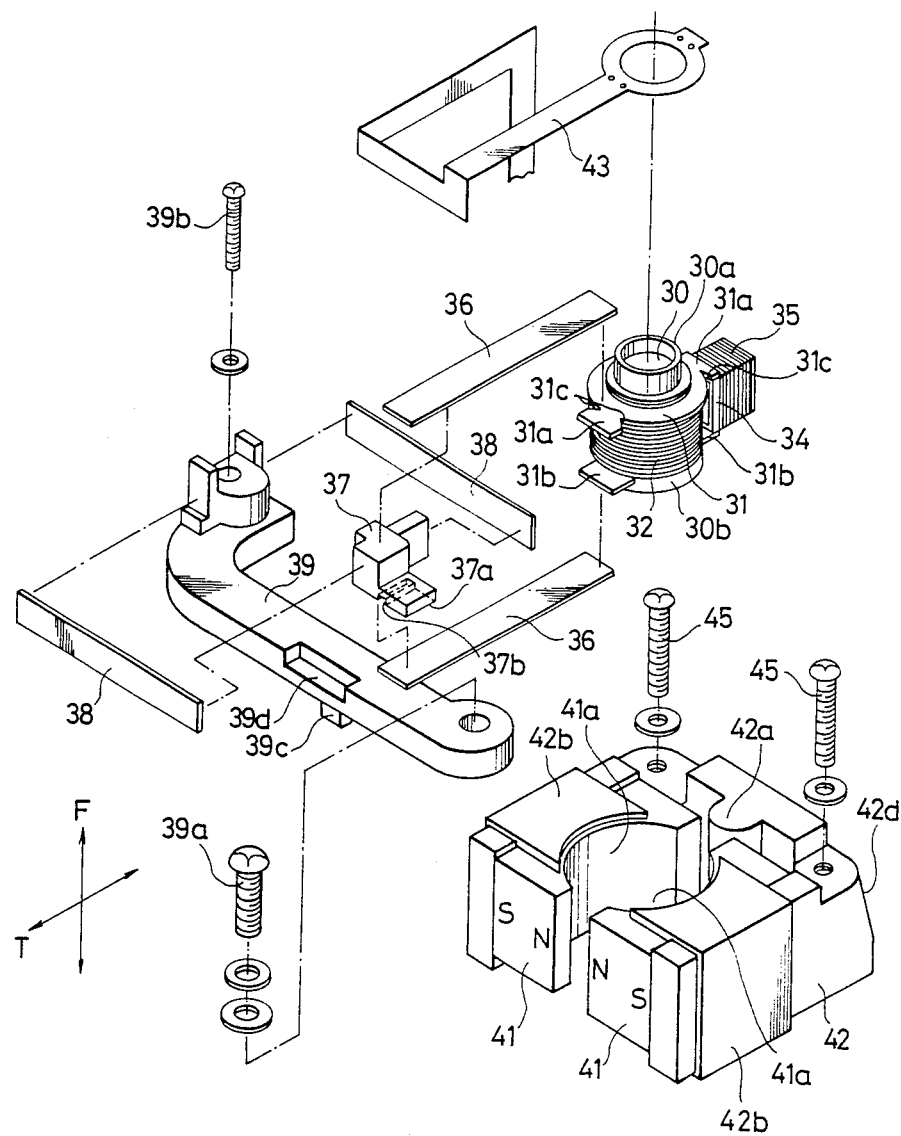
FIGS. 12 and 13 are perspective views showing the objective lens and the mechanism for driving it, with the components being unassembled in FIG. 12 and assembled in FIG. 13.
Figure 13:
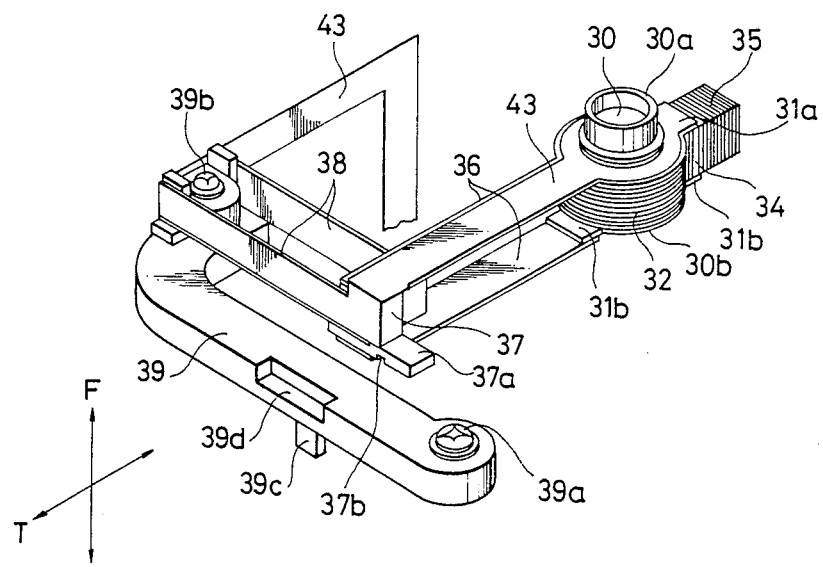

As shown in FIG. 1, an objective lens 30 is disposed above the wavelength plate 25 in order to permit the light emerging from the laser diode 3 to be focused as a spot on the recording surface of the disk 29. The periphery of the objective lens 30 is fitted with cylindrical lens pad 30a. The lens 30 is fitted on top of a generally cylindrical lens holder 31 (serving as a first retaining member) such that the optical axis of the lens is in alignment with the central axis of that lens holder. As is also shown in FIGS. 12 and 13, the turns of a focusing coil 32 are wound around the lens holder 31 such that the central axis of the coil is in alignment with the optical axis of the objective lens 30. The underside of the lens holder 31 is provided with a counterweight 30b. The lens holder 31 is provided with a pair of tongues 31a, 31a at one end of its central axial direction, and is provided with another pair of tongues 31b, 31b at the other end; the tongues of each pair extend in a direction perpendicular to the optical axis of the objective lens 30 and project in opposite directions with respect to the central axis of the lens holder 31. The two pairs of tongues are disposed such that a tongue 31a on one side of the holder 31 and a tongue 31b on the same side face each other in the axial direction of the holder, while a tongue 31a on the opposite side of the holder and a tongue 31b on that opposite side also face each other in the axial direction of the holder. A bobbin 34 having a rectangular cross section is fitted between two opposing tongues 31a and 31b on one side of the holder 31. The turns of a tracking coil 35 are wound around the bobbin 34 such that the central axis of the coil is in alignment with the optical axis of the objective lens 30. This tracking coil 35 is hereunder referred to as the second coil and the focusing coil 32 as the first coil. The lens holder 31 and the bobbin 34 will be referred to as the first and second retaining members, respectively.

Each of the tongues 31a and 31b which extend in a direction opposite to that in which the bobbin 34 is provided is connected to one end of a leaf spring 36; the two leaf springs 36 provide a pair of parallel flexible members that are spaced from each other along the optical axis of the objective lens 30 and are flexible in the direction of that optical axis. The other end of each leaf spring is connected to a relay member 37. Therefore, each of the leaf springs 36 is attached to the relay member 37 in the form of a cantilever. The relay member 37 is also connected to, another pair of parallel leaf springs 38 (flexible members) at one end thereof; these two leaf springs 38 are spaced from each other in a direction normal to the optical axis of the objective lens 30 and are flexible in that direction. The other end of each leaf spring 38 is connected to a base member 39. Therefore, each of the leaf springs 38 is attached to the base member 39 in the form of a cantilever.

The aforementioned lens holder 31 as combined with the bobbin 34, leaf springs 36, relay member 37, leaf springs 38, base member 39 and associated peripheral minor components will make up a support mechanism which supports the objective lens 30 in such a manner that it is movable in both the direction of its optical axis and in the direction normal thereto and that the optical axis of said objective lens will be kept normal with respect to the recording surface of the disk 29.

The manner in which the relay member 37 is coupled to each of the leaf springs 36 and 38 is hereunder described in greater detail.

The leaf springs 36 and 38 are each bonded adhesively to the relay member 37. The relay member 37 has a projection 37a that protrudes from each of the surfaces at which the member is bonded to the leaf springs. As is evident particularly from FIG. 12, the relay member 37 has an adhesive relief groove 37b provided between the projection 37a and the surface at which the member 37 is bonded to the lower leaf spring 36. The projection 37a is retained by a jig or other appropriate means (not shown) while each of the leaf springs 36 and 38 is bonded to the relay member 37, and because of the relief groove 37b, the adhesive will not spread to the jig or other retainer used and unwanted bonding thereof to the relay member 37 is prevented.

In the next place, we describe in detail how the base member 39 is fixed to the pickup body 1.

As shown in FIGS. 4, 12 and 13, the base member 39 is elongated and bent to provide a generally L-shaped form; it is fixed to the pickup body 1 by means of screws 39a and 39b that are inserted into two opposite ends of the member 39. The screw 39b is positioned in the vicinity of the fixed end of each of the leaf springs 38 connected to the base end of the base member 39, and in the embodiment shown, this screw is positioned between the two leaf springs 38, 38. The underside of the base member 39 is provided with a positioning projection 39c that properly positions the base member in relation to the pickup body 1 by means of engaging with the peripheral edge of a rectangular recess 1n formed in the upper surface of the pickup body 1 (see FIG. 8(d)). This arrangement ensures a very precise positioning of the base member 39 in relation to the pickup body 1.

As shown in FIGS. 4 and 12, a pair of magnets 41 is disposed in such a manner that magnetic poles of the same polarity face each other in both the direction of the optical axis of the objective lens 30 and in the direction normal to that direction, and such that the focusing coil 32 and tracking coil 35 are sandwiched between those facing magnetic poles. The two magnets 41, 41 are magnetically coupled by a generally U-shaped yoke 42. The magnets 41 as combined with the yoke 42 make up a magnetic circuit that generates lines of flux linking with the two coils 32 and 35.

The yoke 42 has a projection 42a in an area which is not in contact with the magnets 41, and this projection 42a is formed such that its foremost end is in close proximity to the tracking coil 35. This projection 42a helps increase the lines of flux linking with the tracking coil 35, thereby enhancing the force for driving the objective lens in tracking direction T. The yoke 42 is also provided with subyokes 42b that are disposed in other areas where the yoke is not in contact with the magnets and the foremost end of each of which is in close proximity to the focusing coil 32. The subyokes 42b may be in the form of projections which are integral parts of the yoke 42 as in the case of the projection 42a. These subyokes 42b will help increase the lines of flux linking with the focusing coil 32, thereby enhancing the force for driving the objective lens in focusing direction F.

As is evident particularly from FIG. 12, the opposing faces of the pair of magnets 41 are concave to provide recesses 41a each having an arched cross section in a direction transverse to the optical axis of the objective lens 30, and the focusing coil 32 is inserted between the two recesses 41a. The dimensions of the recesses 41a are such that the range over which the focusing coil 32 is capable of moving in the direction of the central axis of the tracking coil 35 is greater than that over which the focusing coil is movable in the direction in which the pair of magnets 41 face each other. In order to meet this requirement, the recesses 41a are so formed that they, when combined together, will provide an elliptic or elongated cross section whose major axis lies in the direction of the central axis of the tracking coil 35.

As is shown in FIGS. 12 and 13, a flexible print board 43 is typically provided for the purpose of supplying an electric current for both the focusing coil 32 and the tracking coil 35. The print board is directly bonded to the flexible surfaces of the leaf springs 36 and 38, as well as to the relay member 37 and the base member 39 to which the leaf springs are fixed. Although not shown, the print board 43 is bonded to the flexible surfaces of the leaf springs 36 and 38, and to the fixing members 37 and 39 therefor by means of a vibration-absorbing adhesive. When the leaf springs 36 and 38 deflect as the objective lens 30 is driven, the print board 43 will deform to absorb excessive vibrations which would otherwise cause the resonance of the individual leaf springs to resonate. This vibration-absorbing effect of the print board 43 may be further enhanced by using the vibration-absorbing adhesive.

As shown in FIG. 12, each of the tongues 31a extending from the lens holder 31 serving as a support for the objective lens is provided with a notch 31c on both ends with respect to the direction in which each tongue extends outwardly; these notches provide passages through which the ends of the turns of the focusing coil 32 and the tracking coil 35 can be drawn for connection to the print board 43. As will be apparent from the foregoing explanation, the focusing coil 32 and tracking coil 35 are disposed in such a manner that they are confined within the magnetic circuit including the pair of magnets 41; the provision of the notches 31c through which the ends of the turns of these coils can be guided to the print board 43 is effective in decreasing the spacing between the two magnets 41, thereby facilitating the effort toward reducing the dimensions of the aforementioned magnetic circuit, and hence, the overall size of the pickup unit.

The above-described focusing coil 32 and the tracking coil 35, as combined with the magnetic circuit including the magnets 41 and the yoke 42, the print board 43 and associated peripheral minor components, make up drive means for driving the objective lens 30. This drive means is combined with the aforementioned support mechanism including the leaf springs 36 and 38, so as to make up a drive mechanism for performing the servo driving of the objective lens 30. This drive mechanism is combined with the objective lens 30 to make up a movable optical system. This movable optical system is coupled to the already described fixed optical system having the same optical axis.

Let us here return to the description of the wavelength plate 25. As is typically shown in FIG. 12, the magnetic circuit including the magnets 41 and the yoke 42 is fixed to the pickup body 1 by means of a pair of screws 45; therefore, as is clear from FIG. 1, the tabular base member body 27 carrying the wavelength plate 25 is fixed in such a manner that it is held between the aforementioned magnetic circuit and the pickup body 1. This eliminates the use of any other special member for fixing the base member body 27. As already mentioned, the base member body 27 is combined with the holder 26 to make up a base member, and the wavelength plate 25 is attached to the side of this base member which is opposite to the side facing the objective lens 30.

Figure 14A:
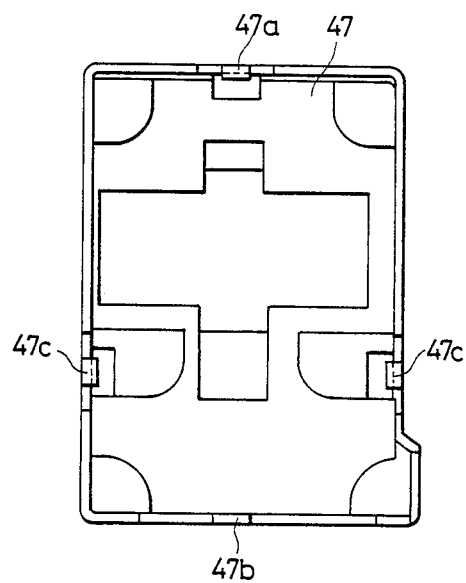

Turning back to the preceding discussion, a cover member 47 is provided such that, as typically shown in FIG. 1, it covers both the objective lens 30 and the drive mechanism for performing the servo driving of the objective lens. This cover member 47 is carried by the base member 39 and the yoke 42, two of the components which make up said drive mechanism. The cover member 47 has a flexible engaging claw 47a at one end thereof (for details, see FIG. 14(a), (b), (d) and (e)), and as shown in FIG. 1, this claw engages with the edge of the underside of the yoke 42 at its end. In other words, the terminal edge of the underside of the yoke 42 provides an area for engagement with the claw 47a. A projection 47b is formed at the other end of the cover member 47 and engages with corresponding recess 39d formed at the edge of the outer top surface of the base member 39. As will be evident from FIGS. 1 and 12, the yoke 42 has a tapered portion 42d which, when the cover member 47 is fitted over the aforementioned drive mechanism, will deflect the claw 47a by engaging therewith. As is also shown in FIG. 14(c), the cover member 47 is provided with a pair of flexible claws 47c on opposite lateral sides, the claws 47c engaging with corresponding recesses 1o formed in the pickup body 1 (see FIG. 8(a), (c), (d) and (f)).

Figure 14B:
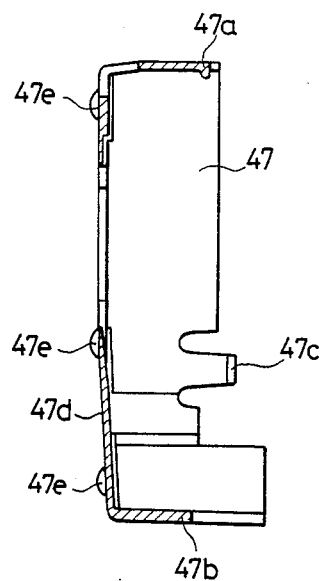
Figure 14D:
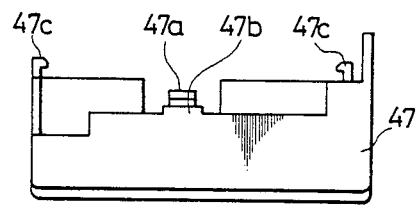

As is clear from FIG. 1, and FIG. 14(b) and (c), the portion 47d of the cover member 47 which faces the recording surface of the disk is partly inclined. As is typically evident from FIG. 1, the cover member 47 is formed such that it runs parallel to the leaf springs 36 which are other components of the already described drive mechanism, and the inclined portion 47d corresponds to these upper leaf springs 36. Each of these leaf springs 36 which are cantilevered at the fixed relay member 37 will deflect to become inclined about the relay member, and the above-described correspondence between the deflecting leaf springs 36 and the inclined portion 47d of the cover member 47 is effective in minimizing the dead space within the cover member 47.

The cover member 47 is also provided with a plurality of generally hemispherical projections 47e on a surface of the inclined portion 47d which faces the recording surface of the disk. By operating a tilt servo mechanism to be described hereinafter, the pickup unit is caused to tilt en masse in such a manner that the cover member 47 is brought into closer proximity to the recording surface of the disk, and in this case, the recording surface of the disk may contact the area of the cover element 47 which faces the recording surface if the magnitude of a wrap or other deformations of the recording surface are excessively great or if abnormal operation of the tilt servo mechanism occurs. According to the present invention, if such contact occurs, only the hemispherical projections 47e will contact the recording surface of the disk and the resulting impact of the contact will be sufficiently mild to ensure that the surface of the disk is not damaged.

Instead of forming the hemispherical projections 47e, a pad made of felt or any other suitable materials may be attached to the upper surface of the cover member 47, and the so attached pad will also work as a shock absorber.

As shown in FIGS. 2 to 6, the pickup unit of the present invention has a resin-made support 50 which extends along one lateral side of the pickup body 1. The support 50 is connected to the pickup body 1 by screws or other fasteners. The support 50 provides the main portion of the pickup unit together with the pickup body 1; it also provides a retaining mechanism for retaining other components such as the plurality of optical elements already described. This retaining mechanism is designed to be movable in a direction parallel to the recording surface of the disk 29.

Figure 2:
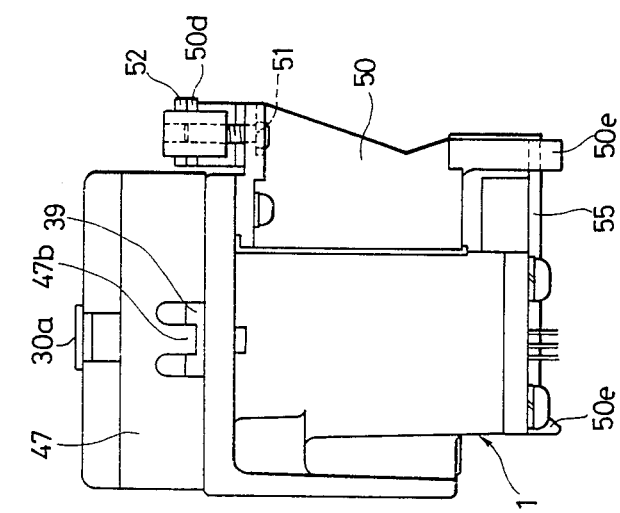
Figure 15D:
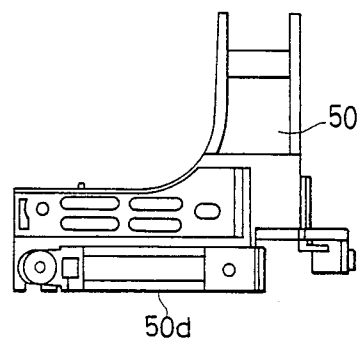
FIGS. 15(a) to (f) show the support from various sides, (a) being a front view, (b) a left side view, (c) a right side view, (d) a plan view, (e) a bottom view, and (f) a rear view.
Figure 15B:
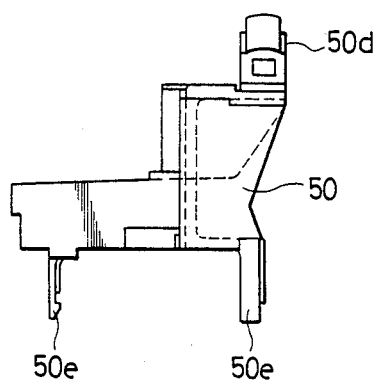
Figure 15A:
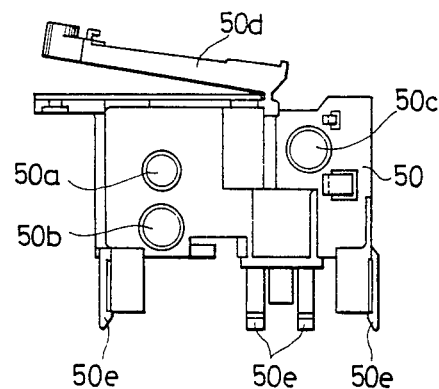
Figure 15E:
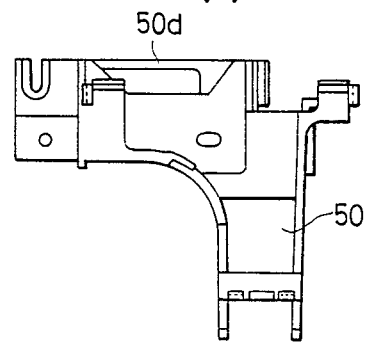
Figure 15C:
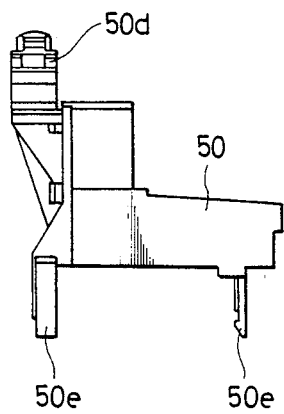
Figure 15F:
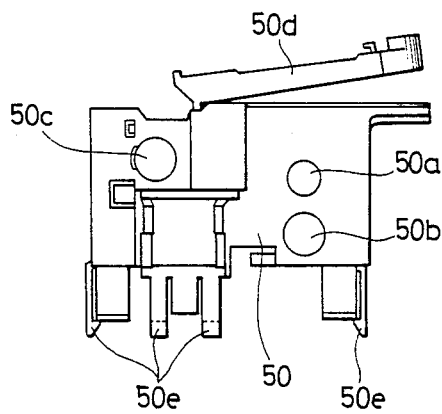

The overall configuration of the support 50 may be clear from FIG. 15(a) to (f). As shown in FIG. 15(a) and (c), the support 50 is provided with openings 50a, 50b and 50c that respectively correspond to the holes 1d, 1f and 1g formed in the pickup body 1, and appropriate adjustment jigs are inserted into the holes 1d, 1f and 1g through these openings 50a, 50b and 50c. The support 50 has a longitudinal sensor stay 50d as an integral part thereof; the sensor stay is formed at one end of the support in the vicinity of the movable optical system (already described) including the objective lens 30. Stated more specifically, the sensor stay 50d is coupled to the body of the support 50 at one end thereof and is swingable about the end within a plane perpendicular to the recording surface of the disk. As shown in FIGS. 2, 4 and 5, a pivotally fitted screw 51 is threaded into the body of the support 50, and by pivoting this screw 51, the angular position of the swinging sensor stay can be changed.

Figure 3:
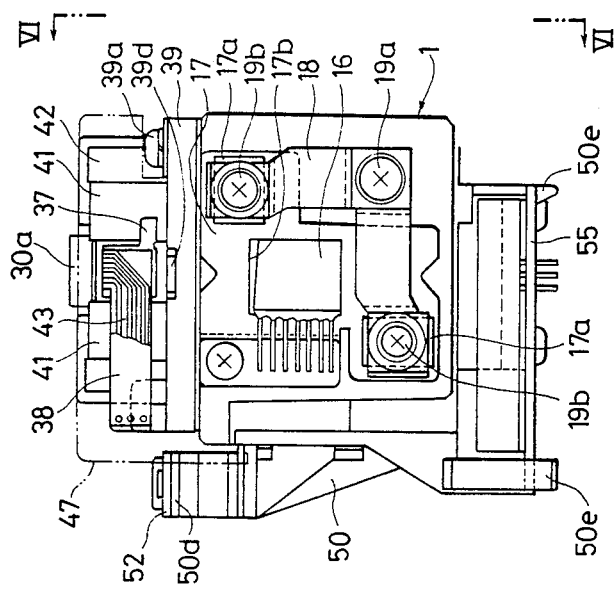

As is shown in FIG. 3, a sensor board 52 is fixed to the top of the sensor stay 50d by means of a screw 52a (see FIG. 4), and as shown in FIG. 4, a light-emitting diode 53 and a pair of photodiodes 54 are fixed on the sensor board. As already mentioned, the pickup unit of the present invention is provided with a tilt servo mechanism which maintains an orthogonal relationship between the optical axis of the beam spot of the laser projected onto the recording surface of the disk and the recording surface. Although not shown, an appropriate pivot support pin is inserted into a round hole 1p that is formed in the pickup body 1 and which is typically shown in FIG. 6 and the pickup unit is slightly pivoted around the support pin in correspondence with any distortion such as warpage that may exist in the recording surface of the disk. The light emitting diode 53 and the photodiodes 54 mentioned above will serve as sensors for detecting the angle of relative inclination between the optical axis of the spot beam of the laser and the recording surface of the disk.

The support 50 has a plurality of flexible engaging claws 50e as integral parts thereof and they are formed at the other end of the support, namely, at the end which is opposite the end where the sensor stay 50d is formed. These engaging claws help to carry a control circuit board 55 on the support 50.

In the pickup unit having the configuration described in the foregoing pages, the light emitted from the laser diode 3 passes successively through the grating 4, beam splitter 5, collimator lens 6, wavelength plate 25 and the objective lens 30 and is focused as a small beam spot on the recording surface of the disk 29. The light reflected from the recording surface of the disk 29 travels back through the objective lens 30, wavelength plate 25 and the collimator lens 6 to enter the beam splitter 5, where it is deflected to pass through the multiplex lens 20 and reach the light-receiving device 16.

As shown in FIG. 16, the light-receiving surface of the device 16 is provided with a photodiode 57 for both reproducing RF signals and performing the focusing servo, and a pair of photodiodes 58 for performing the tracking servo. The light-receiving surface of the photodiode 57 is divided into four sectors, 57a, 57b, 57c and 57d. The operating principles of the photodiode 57 are well known and need no detailed explanation; it will suffice to say that the diode 57 makes use of the phenomenon wherein convergent light passing through a "cylindrical lens" is focused in the form of two focal lines which are orthogonal to each other. Relying upon this effect, the diode 57 detects and measures the amount of light falling on each of the sectors 57a to 57d. On the basis of the results of this photometric analysis, the diode 57 evaluates the relative position of the recording surface of the disk and the objective lens 30, and if the spot beam of the laser is found to improperly focused on the recording surface of the disk, focus servo is performed so as to drive the objective lens 30 until proper focus is obtained. In this connection, it should be mentioned that in addition to working as a cylindrical lens which performs the function just described, the multiplex lens 20 also serves as a convex lens which converges the light reflected from the recording surface of the disk. The tracking servo signal is obtained in accordance with the difference between the amount of light received by one photodiode 58 and that intercepted by the other photodiode 58.

As shown in FIG. 17, the objective lens 30 reciprocates between two positions, the first position being closer to the recording surface of the disk 29 (as indicated by a two-short-and-one-long dashed line) and the second position being further away from the recording surface (as indicated by a one-short-and-one-long dashed line). The position at which the objective lens 30 is caused to stop (as indicated by the solid line) when no power is supplied to the drive means (already described) for driving the objective lens is set closer to the second position of the objective lens than the center or the point intermediate between the first and the second positions. In other words, if the objective lens 30 has a stroke S, then the dimension indicated by L in FIG. 17, or the distance by which the second position of the objective lens is spaced from the position at which the lens is caused to stop when power is off, is smaller than S/2.

As will be understood from the foregoing description, the pickup unit for use in an optical information record/reproduce system in accordance with the present invention includes a sensor for detecting the angle of inclination of the optical axis of a spot beam from a laser in relation to the recording surface of the recording medium, and this sensor is attached to a sensor stay mounted on a retaining mechanism which holds a plurality of optical elements including an objective lens and which is movable in a direction parallel to said recording surface, with said sensor stay being movable in relation to said recording surface.

Because of this arrangement, not only errors that may be introduced into the radiation mode and the amount of light issuing from a light-emitting device included in the sensor but also variations in the output characteristics of a light-receiving device can be compensated for by properly adjusting the sensor stay through mechanical movement.

In accordance with another aspect of the present invention, the retaining mechanism in the pickup unit has a retaining member that incorporates all the optical elements used except for the objective lens and which provides a fixed optical system together with such optical elements, and a resin-made support that extends along one lateral side of the retaining member and which has, as an integral part thereof, the sensor stay at one end of said support in the vicinity of a movable optical system including the objective lens, the support carrying a control circuit board at the other end thereof.

Because of this arrangement wherein the control circuit board is carried on the support having the sensor stay as an integral part thereof, there is no need to fabricate the sensor board, the control circuit board or other members is separate carriers and to mount them on their retaining mechanism by means of screws or other appropriate fastening means as in the conventional pickup unit. Consequently, the pickup unit of the present invention can be fabricated using a smaller number of parts, and this contributes to reduction not only of the manufacturing costs but also of the overall size of the unit.

What is claimed is:

1. A pickup unit for use in an optical information record/reproduce system comprising a plurality of optical elements including a light-emitting device (3) and an objective lens (30) by which the light issuing from said light-emitting device is focused as a beam spot on the recording surface of a recording medium (29), a retaining mechanism (1, 50) that holds said plurality of optical elements and which is movable in a direction (T) parallel to said recording surface, and a tilt servo mechanism for causing the optical axis of said beam spot to intersect said recording surface at right angles, said tilt servo mechanism including a sensor mechanism for detecting the angle of inclination of said optical axis in relation to said recording surface, said sensor mechanism including a support board, and said pickup unit further comprising a sensor stay (50d), to which said support board is integrally attached, for supporting said sensor mechanism, said sensor stay being integrally attached to said retaining mechanism and being movable with respect to said recording surface such that said sensor mechanism is movable with respect to said recording surface.

2. A pickup unit for use in an optical information record/reproduce system comprising a plurality of optical elements including a light-emitting device and an objective lens by which the light issuing from said light-emitting device is focused as a beam spot on the recording surface of a recording medium, a retaining mechanism that holds said plurality of optical elements and which is movable in a direction parallel to said recording surface, and a tilt servo mechanism for causing the optical axis of said beam spot to intersect said recording surface at right angles, said tilt servo mechanism including a sensor mechanism for detecting the angle of inclination of said optical axis in relation to said recording surface, said retaining mechanism having a retaining member (1) that incorporates said plurality of optical elements excluding the objective lens and which provides a fixed optical system together with such optical elements, a resin-made support (50) that extends along one lateral side of said retaining member, and a sensor stay, to which said sensor mechanism is integrally attached, for supporting said sensor mechanism, said sensor stay being attached to one end of said support, in the vicinity of a movable optical system including the objective lens, such that said sensor stay is movable with respect to said recording surface such that said sensor mechanism is movable with respect to said recording surface, said support carrying a control circuit board at the other end thereof.

3. A pick-up unit according to claim 1, wherein said retaining mechanism includes a resin-made support and a retaining member, said retaining member incorporating said plurality of optical eleents, said support extending along one lateral side of said retaining member, and said sensory stay being attached to one end of said support.

4. A pick-up unit according to claim 3, wherein said plurality of optical elements incorporated by said retaining member excludes the objective lens.

5. A pick-up unit according to claim 3, wherein said pick-up unit further comprises means for integrally attaching said sensor stay to said retaining member such that said sensor stay is adjustable in a plane parallel to said recording surface.

* * * * *